United States Patent
Yamamoto

(10) Patent No.: US 8,694,498 B2
(45) Date of Patent: Apr. 8, 2014

(54) DATA MANAGEMENT APPARATUS AND DATA PROCESSING METHOD

(75) Inventor: Naoko Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/327,359

(22) Filed: Dec. 3, 2008

(65) Prior Publication Data

US 2009/0150429 A1 Jun. 11, 2009

(30) Foreign Application Priority Data

Dec. 7, 2007 (JP) ................. 2007-317588

(51) Int. Cl.
*G06F 17/30* (2006.01)
(52) U.S. Cl.
USPC .......................................... 707/736
(58) Field of Classification Search
USPC .............................. 707/736, 738
See application file for complete search history.

(56) References Cited

U.S. PATENT DOCUMENTS

| 6,629,104 | B1 * | 9/2003 | Parulski et al. ............... 382/307 |
| 7,587,101 | B1 * | 9/2009 | Bourdev ...................... 382/291 |
| 7,822,746 | B2 * | 10/2010 | Svendsen ..................... 707/736 |
| 2005/0246374 | A1 * | 11/2005 | Blinn et al. ................ 707/104.1 |
| 2006/0044635 | A1 | 3/2006 | Suzuki |
| 2006/0259511 | A1 * | 11/2006 | Boerries et al. .......... 707/103 R |

FOREIGN PATENT DOCUMENTS

| JP | 2005-196529 A | 7/2005 |
| JP | 2006-072614 A | 3/2006 |

* cited by examiner

*Primary Examiner* — Rehana Perveen
*Assistant Examiner* — Alexander Khong
(74) *Attorney, Agent, or Firm* — Canon USA, Inc. IP Division

(57) ABSTRACT

In a data management apparatus that performs data management by assigning metadata to a plurality of data, the plurality of data are displayed according to a display mode chosen from a plurality of display modes for displaying the plurality of data as a set of attribute information of the data, and a candidate for metadata to be assigned to the displayed data is determined based on the display mode.

3 Claims, 23 Drawing Sheets

FIG. 7

DISPLAY ATTRIBUTE = DATE (701)

| DATE (702) | METADATA CANDIDATE (703) |
|---|---|
| JAN 1 | NEW YEAR'S DAY |
| FEB 14 | ST. VALENTINE'S DAY |
| MAR 3 | DOLL FESTIVAL |
| MAY 5 | CHILDREN'S DAY |
| ⋮ | ⋮ |
| DEC 25 | CHRISTMAS |
| DEC 31 | NEW YEAR'S EVE |

FIG. 8

DISPLAY ATTRIBUTE = POSITION INFORMATION (801)

| POSITION INFORMATION (802) | | METADATA CANDIDATE (803) |
|---|---|---|
| LATITUDE | LONGITUDE | |
| 35.63 | 139.88 | URAYASU, CHIBA PREFECTURE |
| 35.68 | 139.75 | CHIYODA, TOKYO |
| 35.01 | 135.75 | KYOTO CITY, KYOTO |

FIG. 9

| DISPLAY ATTRIBUTE = DATE | | |
|---|---|---|
| DATE | METADATA CANDIDATE A | METADATA CANDIDATE B |
| JAN 1 | NEW YEAR'S DAY | NEW YEAR'S HOLIDAYS |
| JAN 2 | | |
| JAN 3 | | |
| FEB 14 | ST. VALENTINE'S DAY | |
| MAR 3 | DOLL FESTIVAL | |
| MAY 3 | CONSTITUTION DAY | BIRTHDAY |
| MAY 4 | | |
| MAY 5 | CHILDREN'S DAY | |
| ⋮ | | |
| AUG 14 | | |
| AUG 15 | | BIRTHDAY |
| AUG 16 | | |
| ⋮ | | |
| DEC 25 | CHRISTMAS | |
| DEC 31 | NEW YEAR'S EVE | |

FIG. 10

| DATE | METADATA CANDIDATE A | METADATA CANDIDATE B | METADATA CANDIDATE C |
|---|---|---|---|
| \multicolumn{4}{DISPLAY ATTRIBUTE = DATE} | | | |

| DATE | METADATA CANDIDATE A | METADATA CANDIDATE B | METADATA CANDIDATE C |
|---|---|---|---|
| JAN 1 | NEW YEAR'S DAY | NEW YEAR'S HOLIDAYS | NEW YEAR'S WEEK |
| JAN 2 | | | |
| JAN 3 | | | |
| FEB 14 | ST. VALENTINE'S DAY | | |
| MAR 3 | DOLL FESTIVAL | | |
| MAY 3 | CONSTITUTION DAY | BIRTHDAY | SPRING VACATION |
| MAY 4 | | | |
| MAY 5 | CHILDREN'S DAY | | |
| ⋮ | | | |
| AUG 14 | | | SUMMER VACATION |
| AUG 15 | | BIRTHDAY | |
| AUG 16 | | | |
| ⋮ | | | |
| DEC 25 | CHRISTMAS | | |
| DEC 31 | NEW YEAR'S EVE | | |

FIG. 23

| DISPLAY ATTRIBUTE = DATE | |
|---|---|
| DATE | METADATA CANDIDATE |
| JAN 1 | NEW YEAR'S DAY |
| JAN 2 | |
| JAN 3 | |
| FEB 14 | ST.VALENTINE'S DAY |
| MAR 3 | DOLL FESTIVAL |
| MAY 3 | CONSTITUTION DAY |
| MAY 4 | |
| MAY 5 | CHILDREN'S DAY |
| ⋮ | |
| OCT 10 | |
| ⋮ | |
| DEC 25 | CHRISTMAS |
| DEC 31 | NEW YEAR'S EVE |

FIG. 24

| DATE | METADATA CANDIDATE |
|---|---|
| DISPLAY ATTRIBUTE = DATE ||
| JAN 1 | NEW YEAR'S DAY |
| JAN 2 | |
| JAN 3 | |
| FEB 14 | ST.VALENTINE'S DAY |
| MAR 3 | DOLL FESTIVAL |
| MAY 3 | CONSTITUTION DAY |
| MAY 4 | |
| MAY 5 | CHILDREN'S DAY |
| ⋮ | |
| OCT 10 | ATHLETIC MEET |
| ⋮ | |
| DEC 25 | CHRISTMAS |
| DEC 31 | NEW YEAR'S EVE | ns
DATA MANAGEMENT APPARATUS AND DATA PROCESSING METHOD

BACKGROUND OF THE INVENTION

1. Field of the Invention

The present invention relates to a data management apparatus and a data processing method.

2. Description of the Related Art

In recent years, the amount of private content such as images taken with digital camera or content acquired via a network has increased rapidly due to the advent of large-capacity storage media as well as the spread of digital cameras and improvements in network environments. In some households, for example, images taken using a digital camera are stored on large-capacity storage media and desired images are read out for use from the stored images as the need arises.

However, searching for and retrieving desired data efficiently becomes more difficult as the volume of target data increases.

To solve this problem, methods for saving data after the data has been automatically classified and search systems that improve search efficiency have been proposed. As for methods of automatically classifying data, for example, a method has been proposed in which images in a folder are classified by being segmented, in order, into same free character groups, consecutive file number groups, and same date information groups, with specific folder names being assigned to each group. For example, see Japanese Patent Application Laid-Open No. 2005-196529.

As for search systems, methods of searching for document data with characters or words as search keys are generally widely known, although in the case of data such as moving images, still images and audio, difficulties are encountered in designating the contents of the data itself as a search key.

In view of this, methods have been proposed that improve search efficiency by assigning the contents or characteristics of data to the data as additional information (metadata) irrespective of the data type, thereby facilitating data usability. Some metadata represents keywords and descriptions with language information and other metadata represents moving image characteristics or audio characteristics that the apparatus can easily search for as non-language information such as attachments.

However, the task of assigning such metadata to all mass data targeted for management is not always easy.

Also, when the user assigns metadata manually, different metadata gets assigned where the same metadata should have been appended, or the same metadata gets assigned where different metadata should have been appended, as a result of which data is not classified as the user intended. Therefore, difficulties are encountered in efficiently searching for data using metadata.

To solve this problem, a method has been proposed in which searching for data is facilitated by extracting attachment information from an image file, further extracting a keyword of the individual corresponding to the extracted attachment information, and adding the keyword to the attachment information. For example, see Japanese Patent Application Laid-Open No. 2006-72614.

However, with the method proposed in Japanese Patent Application Laid-Open No. 2005-196529, the user is unable to find out how desired data has been classified since that the files are automatically classified, making it difficult use classification efficiently in searching for data.

With the method proposed in Japanese Patent Application Laid-Open No. 2006-72614, the same keyword is assigned to images taken of the same object since the user assigns a keyword of the individual in advance to specific image attachment information, making classification in line with the intent of the user impossible.

Thus, the user may not know which metadata has been assigned to what data, making it difficult to search for desired data without knowing how the data has been classified.

SUMMARY OF THE INVENTION

An aspect of the present invention is to maintain the consistency of metadata while at the same time reflecting the intent of the user, when assigning metadata.

According to another aspect of the present invention, there is provided a data management apparatus that performs data management by assigning metadata to a plurality of data, comprising: a display unit that displays the plurality of data, according to a display mode chosen from a plurality of display modes for displaying the plurality of data as a set of attribute information of the data; and a determination unit that determines a candidate for metadata to be assigned to the displayed data based on the display mode.

According to yet another aspect of the present invention, there is provided a data processing method executed by a data management apparatus that performs data management by assigning metadata to a plurality of data, comprising: displaying the plurality of data, according to a display mode chosen from a plurality of display modes for displaying the plurality of data as a set of attribute information of the data; and determining a candidate for metadata to be assigned to the displayed data based on the display mode.

Further features of the present invention will become apparent from the following description of exemplary embodiments with reference to the attached drawings.

BRIEF DESCRIPTION OF THE DRAWINGS

FIG. 7 shows general calendar knowledge used in the case where the display mode for when selecting data is "by date".

FIG. 8 shows general map information knowledge used in the case where the display mode for when selecting data is "by position information".

FIG. 9 shows exemplary calendar knowledge.

FIG. 10 shows further exemplary calendar knowledge.

FIG. 23 shows an exemplary metadata mapping table prior to metadata being added.

FIG. 24 shows an exemplary metadata mapping table to which metadata designated by the user has been added.

DESCRIPTION OF THE EMBODIMENTS

Figure 1:
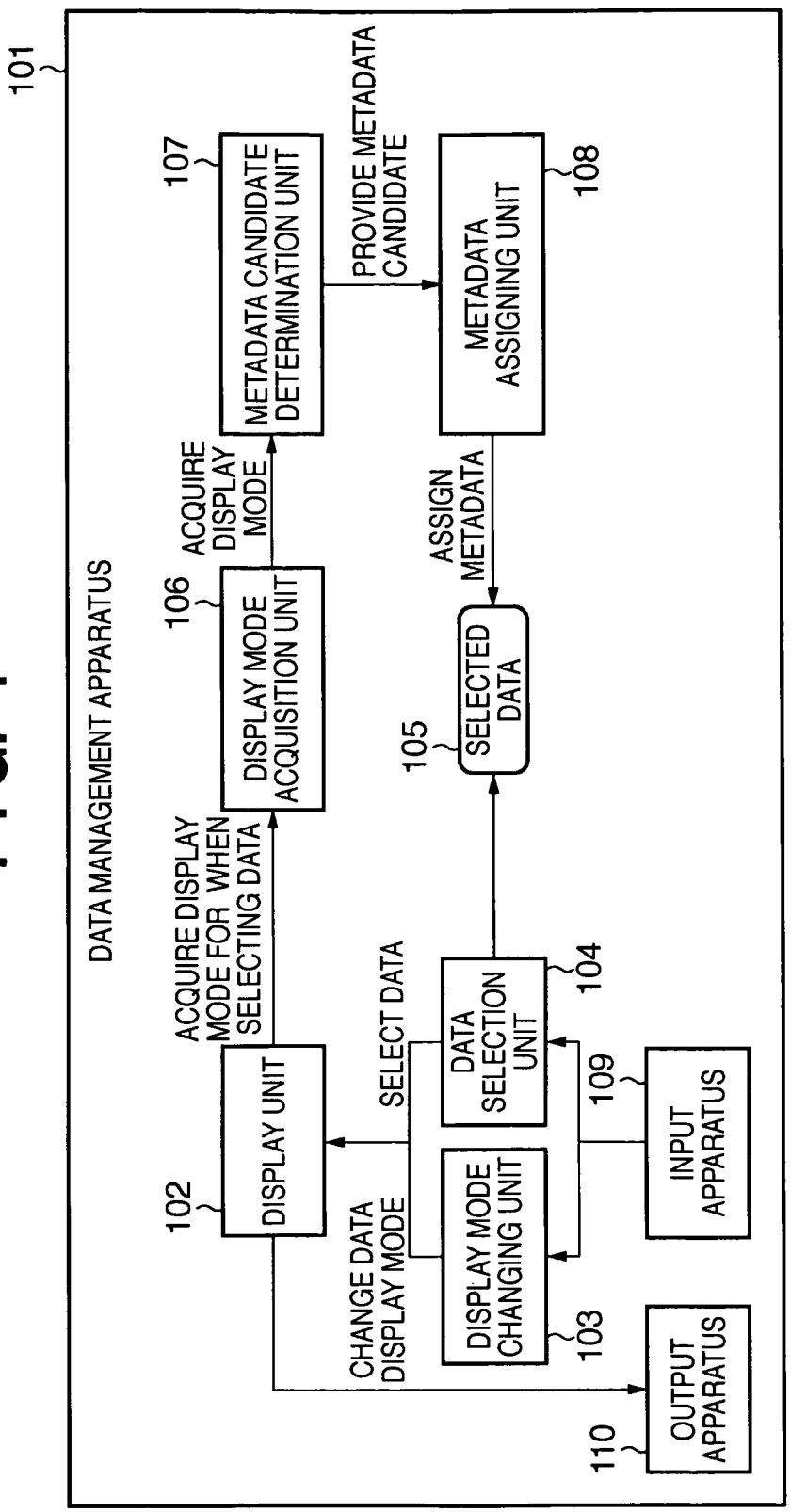
FIG. 1 shows an exemplary configuration of a data management apparatus in embodiments of the present invention.

Hereafter, various embodiments for implementing the invention will be described in detail with reference to the drawing.

FIG. 1 shows an exemplary configuration of a data management apparatus in the embodiments of the present invention. The data management apparatus 101 is constituted by a display unit 102, a display mode changing unit 103, a data selection unit 104, a display mode acquisition unit 106, a metadata candidate determination unit 107, and a metadata assigning unit 108.

The display unit 102 displays data on an output apparatus 110 such as a display. The display mode changing unit 103 changes the display mode based on a user instruction operation input from an input apparatus 109 such as a keyboard or a mouse. The data selection unit 104 selects displayed data based on a user instruction operation input from the input apparatus 109. At this time, selected data is held as selected data 105.

The display mode acquisition unit 106 acquires a display mode for when the selected data 105 is selected by the data selection unit 104. The metadata candidate determination unit 107 determines a metadata candidate with a good chance of being assigned to the selected data 105, according to the display mode acquired by the display mode acquisition unit 106 for when selecting data. The metadata assigning unit 108 assigns metadata to the selected data 105 and saves the resultant data.

Figure 2:
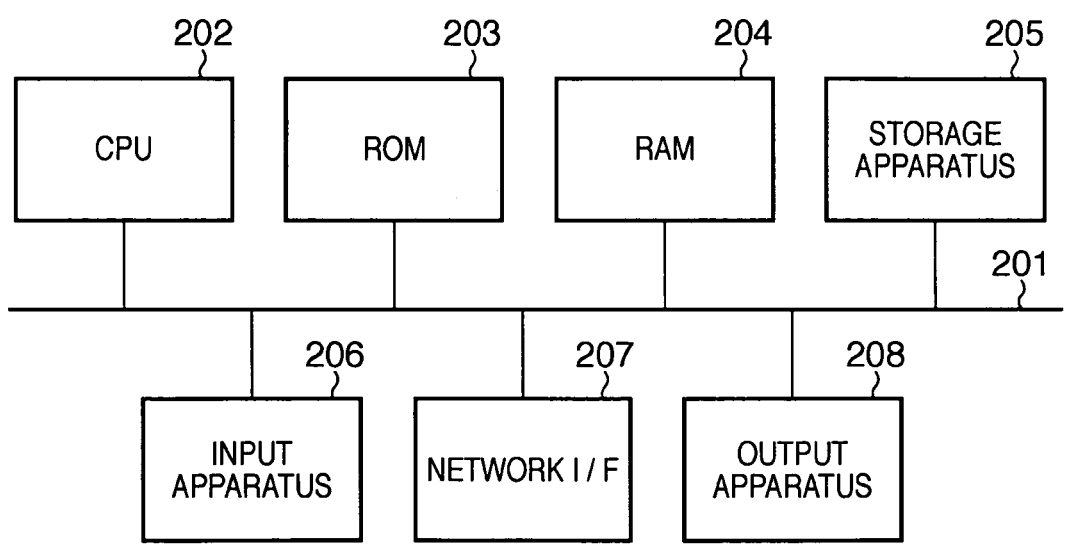
FIG. 2 is a block diagram showing an exemplary hardware configuration in embodiments of the present invention.

FIG. 2 is a block diagram showing an exemplary hardware configuration in the embodiments of the present invention. As shown in FIG. 2, the data management apparatus includes a CPU 202, a ROM 203, a RAM 204, a storage apparatus 205, an input apparatus 206, a network interface (I/F) 207, and an output apparatus 208.

The CPU 202 performs calculations, logical judgments and the like for the various processes, and controls the various constituent elements connected to a system bus 201. The ROM 203 stores computer programs for control performed by the CPU 202 including processing procedures that will be described below based on the flowcharts. The RAM 204 is a memory used as a work area when the CPU 202 executes computer programs, as well as for temporarily storing data.

The storage apparatus 205 is a nonvolatile memory, a hard disk or the like for storing data and computer programs. The input apparatus 206 is a mouse, a touch panel, a keyboard or the like for inputting information from the user. The output apparatus 208 is a display apparatus such as a cathode-ray tube (CRT) or a liquid crystal display (LCD) that outputs analyzed data output information. The network I/F 207 interacts with other storage media or devices connected via a network.

Here, a process of sorting and displaying a plurality of content according to a display mode designated by the user, and determining and assigning a candidate for metadata of content selected by the user from the plurality of displayed content will be described.

Note that the plurality of content are grouped as sets of attribute information such as date, title, position information or the like, with the display modes being equivalent to the groups for when displaying grouped content. The embodiments will be described with "by date", "by title" and "by position information" as exemplary display modes.

In a first embodiment, a process of determining a candidate for metadata to be assigned to content in the case where "by date" has been designated as the display mode and a given content has been selected will be described. Note that in the following description, content may simply be referred to as "data".

Figure 3:
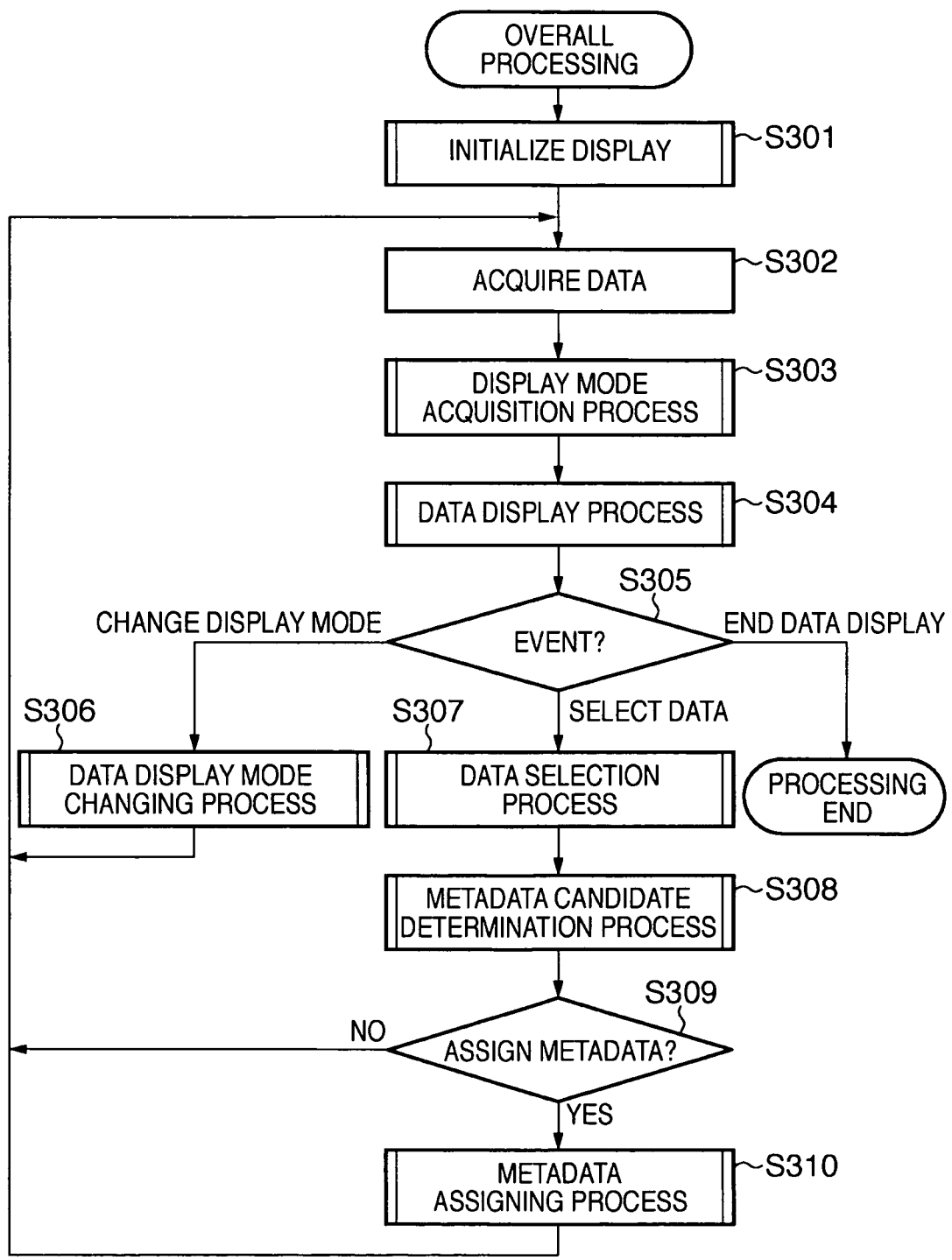
FIG. 3 is a flowchart showing the overall processing of a data management apparatus in a first embodiment.

FIG. 3 is a flowchart showing the overall processing of the data management apparatus in the first embodiment. Note that in FIG. 3, S301 to S310 are reference numerals denoting the various steps. Note also that this processing is executed by the CPU 202 in accordance with a program stored in the ROM 203.

Firstly, in S301, portions in the data management apparatus 101 related to display are initialized. Specifically, processes such as setting the initial value of the display mode and sorting content to be displayed based on the initialized display mode are performed. Next, data to be displayed is acquired in S302, and the display mode is acquired in S303. Then, in S304, data is actually displayed on the output apparatus 208 based on the display data acquired in S302 and the display mode acquired in S303.

Subsequently, in S305, the CPU 202 waits for an event from the user. If an instruction to change the display mode of data is received from the user, the processing proceeds to S306, where a display mode changing process is performed and the display mode of data is changed. Specifically, a process of sorting displayed data and data to be newly display in accordance with the designated display mode is performed. The processing then returns to S302, where data for the changed display mode is acquired, and in S303 and S304, data is displayed and updated in the new display mode.

If the user designates data selection in S305, the processing proceeds to S307, and a data selection process is performed. Specifically, processes such as the user acknowledging selected data and detailed information of the data being acquired, and changing the display to also show on screen that the data selected by the user is currently selected are performed. Subsequently, in S308, a metadata candidate determination process is performed. This process will be described below using FIG. 5.

Once the metadata candidate determining process has ended, the processing proceeds to S309, and it is determined whether to assign metadata. If, as a result of the determination, metadata is to be assigned, the processing proceeds to S310, and the data is saved with the determined metadata candidate appended thereto as metadata. The processing then returns to S302, and the foregoing processing is repeated until the event waiting state of S305.

If, in S305, the user performs an instruction operation for ending data display, this process is ended.

Next, a specific example of the above-mentioned display mode, and an example in which data is displayed according to the display mode will be described using FIG. 4.

Figure 4:
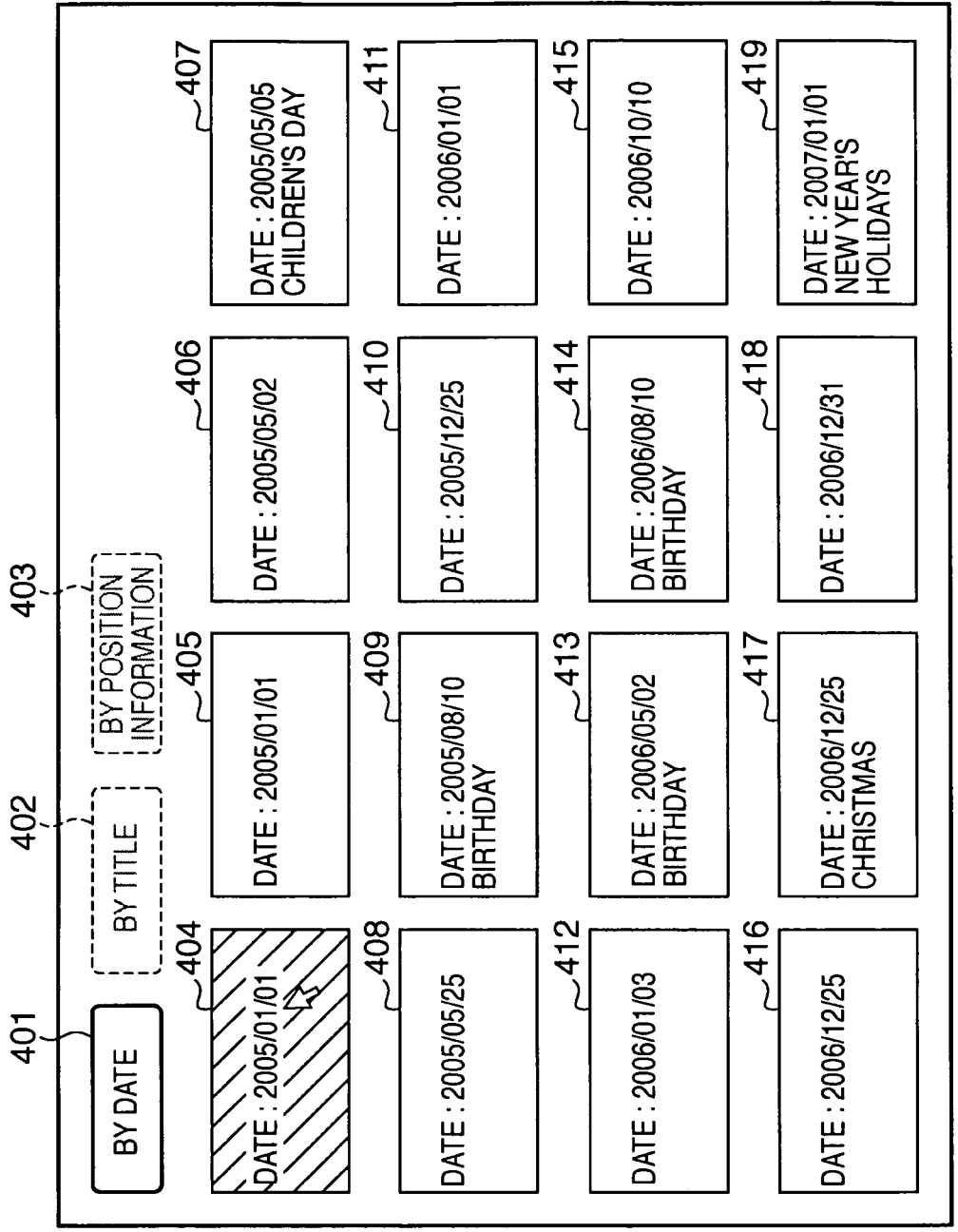
FIG. 4 shows an exemplary state in which a plurality of data are displayed in date order as designated by a user, and one piece of data has been selected.

FIG. 4 shows an exemplary state in which a plurality of data are displayed in date order as designated by the user, and one piece of data has been selected. In FIG. 4, reference numerals 401 to 403 denote buttons for designating the display mode, with 401 being a date order button, 402 being a title order button and 403 being a position information order button. Reference numerals 404 to 419 denote data displayed in accordance with the display mode.

Here, the display mode can be changed as a result of the user designating one of the buttons 401 to 403 using an input apparatus such as a pointing device (mouse). Also, by selecting arbitrary data from 404 to 419, the user is able to assign metadata to that data.

The example shown in FIG. 4 is a state in which the date order button 401 has been designated, and the data 404 to 419 have been sorted and displayed based on respective date information from the upper left to the lower right of the output apparatus. Further, the user has selected the data 404, and is looking to assign metadata to the data 404.

Next, a metadata candidate determination process of determining a candidate for metadata when assigning metadata to data selected by the user will be described using FIG. 5.

Figure 5:
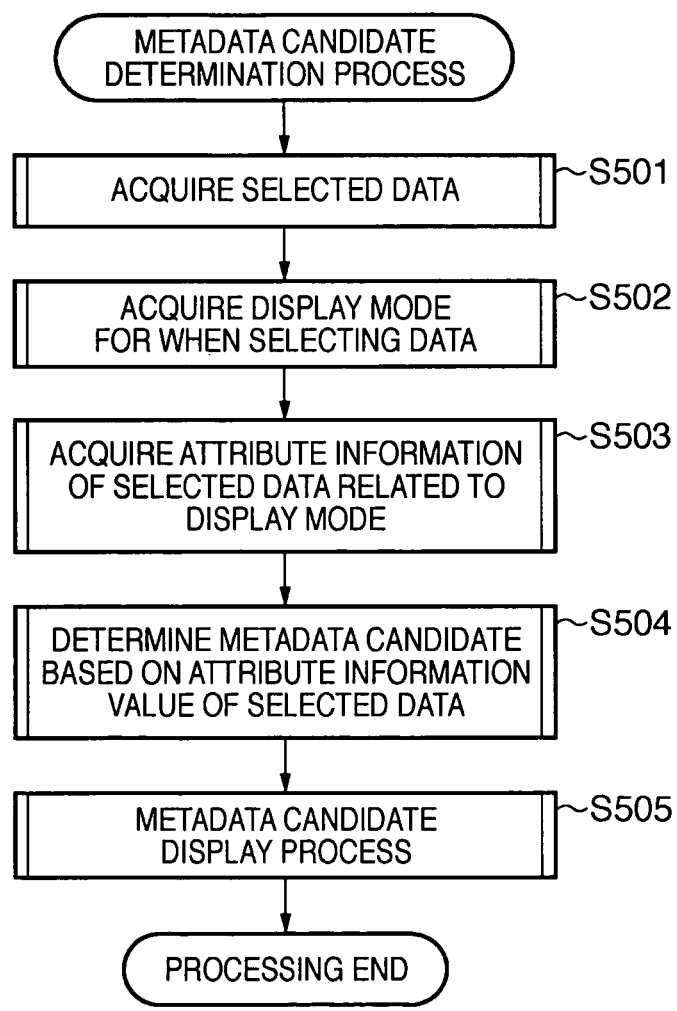
FIG. 5 is a flowchart showing an exemplary metadata candidate determination process in the first embodiment.

FIG. 5 is a flowchart showing an exemplary metadata candidate determination process in the first embodiment. In FIG. 5, S501 to S505 are reference numerals denoting the various steps.

Firstly, in S501, the data selected in the above-mentioned data selection process (S307) is acquired. Here, the data 404 shown in FIG. 4 has been selected. Next, in S502, the display mode acquired in the above-mentioned display mode acquisition process (S303) is acquired. Here, the date order button 401 shown in FIG. 4 has been designated, and the display mode is "by date". Further, in S503, an attribute information value related to the display mode acquired in S502 for when selecting data is acquired from the detailed information of the data acquired in S501.

In the first embodiment, the data 404 in the "by date" display mode has been selected, so the date-related attribute information value "Date: 2005/01/01" of the data 404 is acquired.

Figure 6:
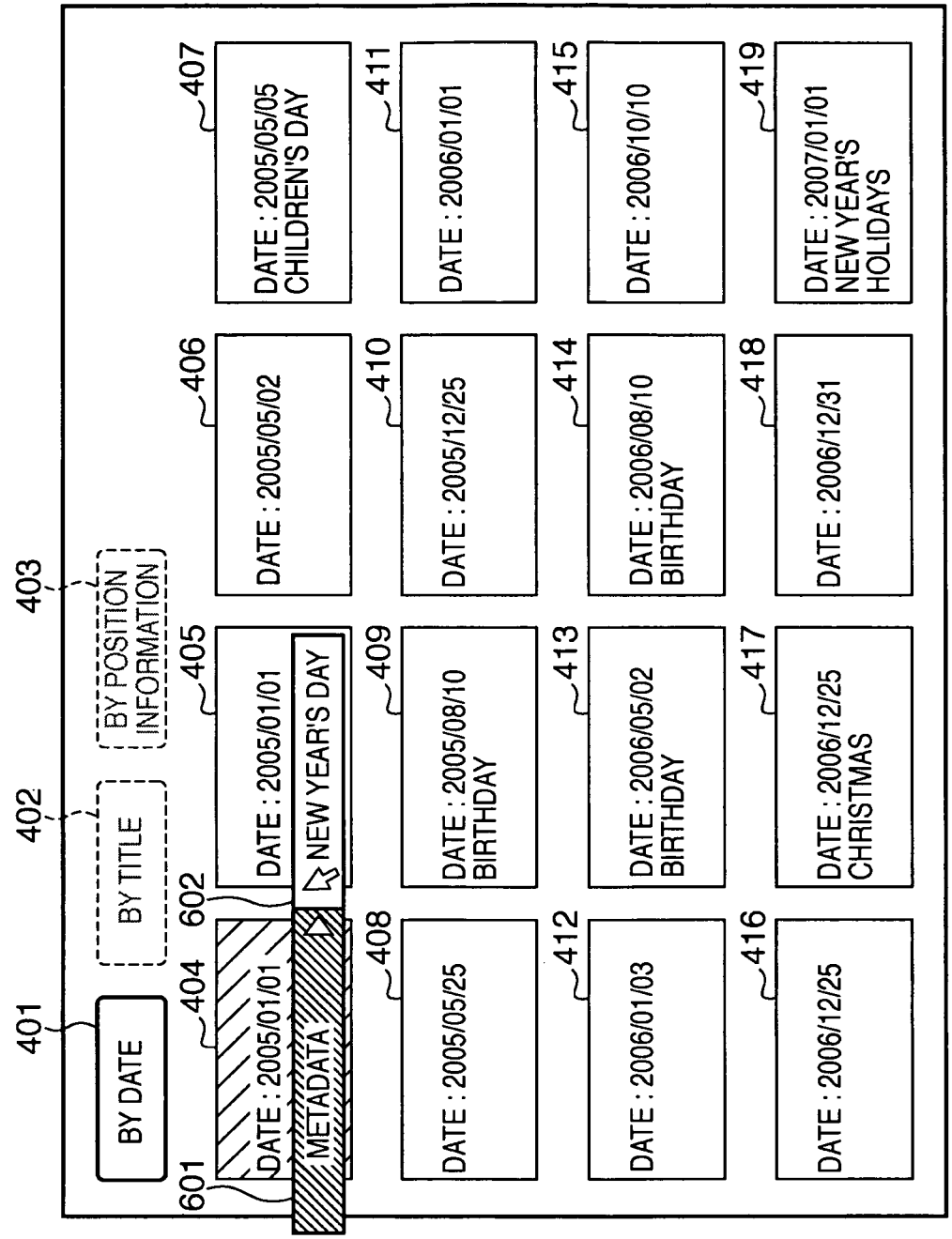
FIG. 6 shows an exemplary state in which a metadata candidate has been determined and displayed based on an attribute information value of data selected by the user.

Next, in S504, a candidate for metadata is determined based on the date-related attribute information value "Date: 2005/01/01" of the selected data 404. Finally, in S505, the metadata candidate determined in S504 is presented (displayed) to the user as metadata, and this process is ended. FIG. 6 shows an exemplary state in which a metadata candidate has been determined and displayed based on the attribute information value of data selected by the user. In this example, "New Year's Day" 602 is displayed as metadata 601.

Here, the process of determining and displaying metadata candidates performed in S504 and S505 will be described in detail. Note that in the first embodiment, the case where a metadata candidate is determined from general knowledge such as shown in FIGS. 7 to 10 is given as an example in the description.

FIG. 7 shows general calendar knowledge used in the case where the display mode for when selecting data is "by date". FIG. 8 shows general map information knowledge used in the case where the display mode for when selecting data is "by position information". In the case where the display mode for when selecting data is "by date", a plurality of metadata candidates may be provided for a given attribute information value and the user allowed to select a metadata candidate, as shown in FIGS. 9 and 10.

Note that this knowledge may be knowledge temporarily saved in the apparatus, or may be referenced from an arbitrary location external to the apparatus when the metadata candidate determination process is executed.

Because the display mode in the above-mentioned example shown in the FIG. 6 is "by date", date calendar knowledge 701 is used for the display attributes shown in FIG. 7. Date information 702 of the calendar knowledge 701 shows only the day and the month, with a metadata candidate 703 corresponding to this information being shown. Here, "January 1" is retrieved as a match when a search is performed for a date that matches the day and month portions of the attribute information value "Date: 2005/01/01" related to the date of the selected data 404. Because the corresponding metadata candidate 703 is "New Year's Day", "New Year's Day" is determined as the metadata candidate 703 to be assigned to the data 404, and, as shown in FIG. 6, "New Year's Day" 602 is presented to the user as the metadata 601.

Note that while a metadata candidate is here determined using calendar information such as shown in FIG. 7, a metadata candidate may be extracted from a date-related general knowledge database (tear-off calendar, event calendar, etc.). Date-related private information may also be extracted.

Further, in terms of the extraction method, a full search may be performed on various database or information with the keyword "Date: 2005/01/01" or a search may be performed for a candidate that partially matches the keyword on a day/month level or a day level.

A metadata candidate related to "date" can thus be determined and presented to the user while reflecting the intent of the user, with consideration given to the fact that the display mode "by date" has significance, when the user assigns metadata.

Next, a second embodiment according to the present invention will be described in detail with reference to the drawings. In the second embodiment, a process of determining a candidate for metadata to be assigned to data in the case where "by position information" has been designated as the display mode and data has been selected will be described.

Figure 11:
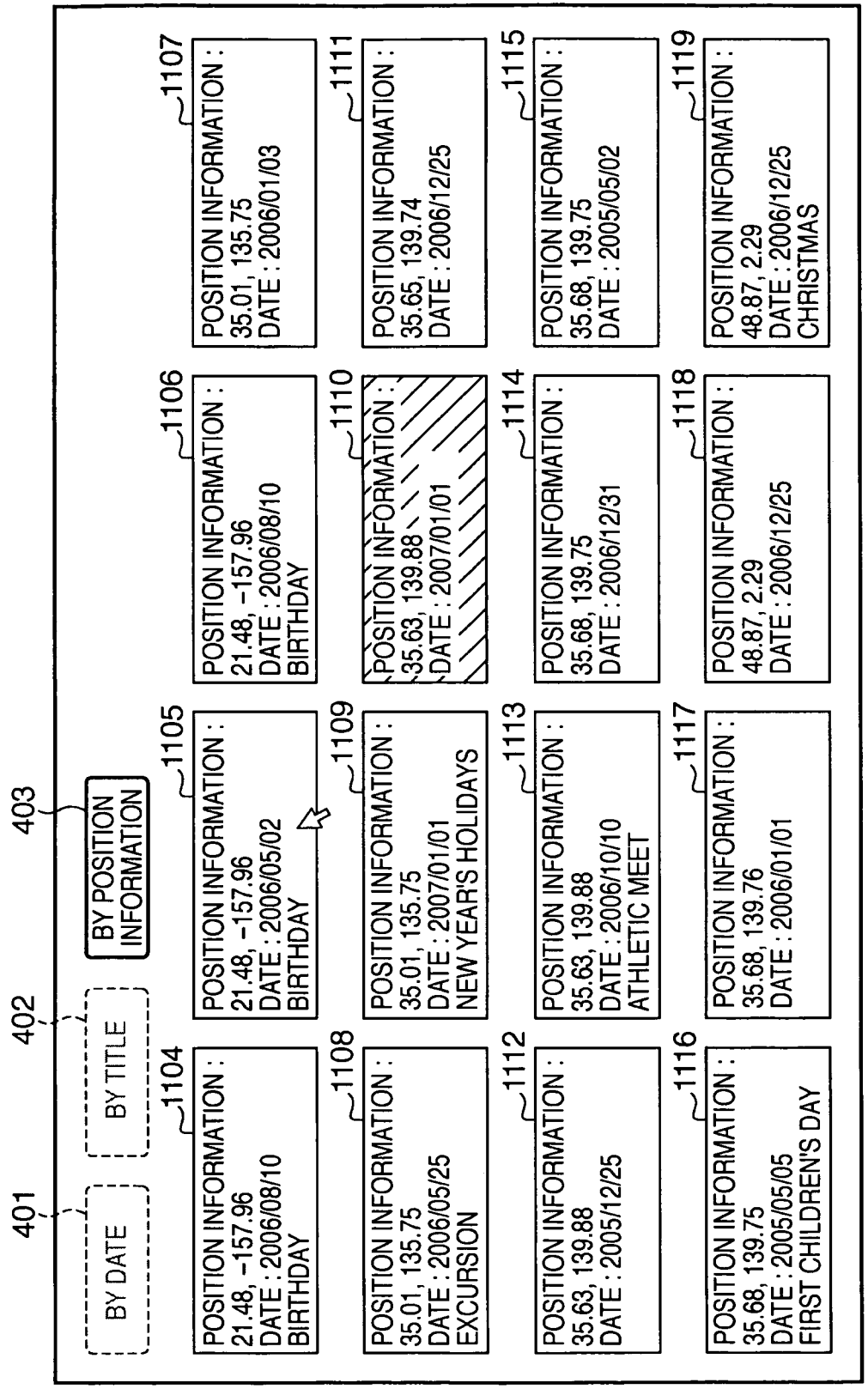
FIG. 11 shows an exemplary state in which a plurality of data are displayed in position information order as designated by the user, and one piece of data has been selected.

FIG. 11 shows an exemplary state in which a plurality of data are displayed in position information order as designated by the user, and one piece of data has been selected. In FIG. 11, reference numerals 1104 to 1119 denote the plurality of data displayed in position information order designated as the display mode.

Similarly to the first embodiment, the display mode can be changed as a result of the user designating one of the buttons 401 to 403 using an input apparatus such as a pointing device (mouse). Also, the user is able to assign metadata to data by selecting arbitrary data from 1104 to 1119.

The example shown in FIG. 11 is a state in which the position information order button 403 has been designated, and the data 1104 to 1119 have been sorted and displayed based on respective position information (latitude information) from the top left to the bottom right of the output apparatus. Further, the user has selected the data 1110, and is looking to assign metadata to the data 1110.

Next, a metadata candidate determination process of determining a candidate for metadata when assigning metadata to data selected by the user will be described. This process is the process shown in FIG. 5 described in the first embodiment in the case where the display mode is "by position information".

Firstly, in S501, the data selected in the above-mentioned data selection process (S307) is acquired. Here, the data 1110 shown in FIG. 11 has been selected. Next, in S502, the display mode acquired in the above-mentioned display mode acquisition process (S303) is acquired. Here, the position information order button 403 shown in FIG. 11 has been designated, and the display mode is "by position information". Further, in S503, an attribute information value related to the display mode acquired in S502 for when selecting data is acquired from the detailed information of the selected data acquired in S501.

In the second embodiment, the data 1110 in the "by position information" display mode has been selected, so the position information-related attribute information value "Position Information: 35.63, 139.88" of the data 1110 is acquired.

Next, in S504, a candidate for metadata is determined based on the attribute information value "Position Information: 35.63, 139.88" of the selected data 1110.

In the second embodiment, map information knowledge 801 such as shown in FIG. 8 is used. An address, landmark or the like is selected as a metadata candidate 803 for latitude/longitude information 802 of the map information knowledge 801.

Figure 12:
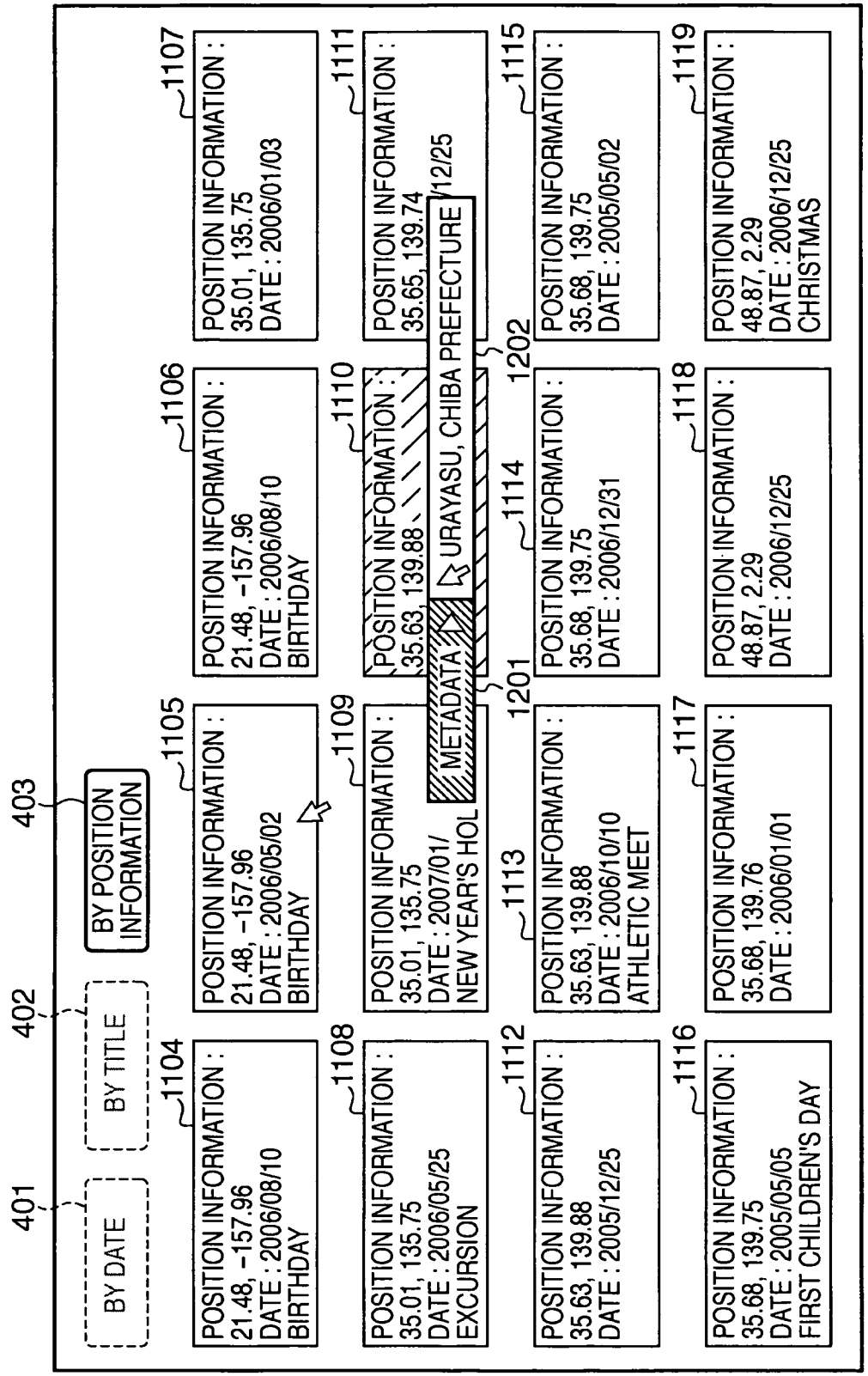
FIG. 12 shows an exemplary state in which a metadata candidate has been determined and displayed based on an attribute information value of data in a second embodiment.

Here, "35.63, 139.88" is retrieved as a match when the position information-related attribute information value "Position Information: 35.63, 139.88" of the selected data 1110 is compared with the latitude/longitude information 802 of the map information knowledge 801 shown in FIG. 8. The corresponding metadata candidate 803 is "Urayasu, Chiba Prefecture", so "Urayasu, Chiba Prefecture" is determined as the metadata candidate 803 to be assigned to the data 1110. Then, in S505, "Urayasu, Chiba Prefecture" 1202 is presented to the user as a metadata candidate 1201, as shown in FIG. 12. FIG. 12 shows an exemplary state in which a metadata candidate has been determined and displayed based on the attribute information value of data in the second embodiment.

A metadata candidate related to "position information" can thus be determined and presented to the user while reflecting the intent of the user, with consideration given to the fact that the display mode "by position information" has significance, when the user assigns metadata.

Also, because a metadata candidate with a good chance of being assigned can be determined and presented, the consistency of the metadata is maintained together with reducing the user's workload in assigning metadata, thereby enabling metadata reusability to be improved.

Next, a third embodiment according to the present invention will be described in detail with reference to the drawings. In the third embodiment, a process of determining a candidate for metadata to be assigned based on the attribute information of two pieces of data in the case where two pieces of data are selected will be described.

Figure 13:
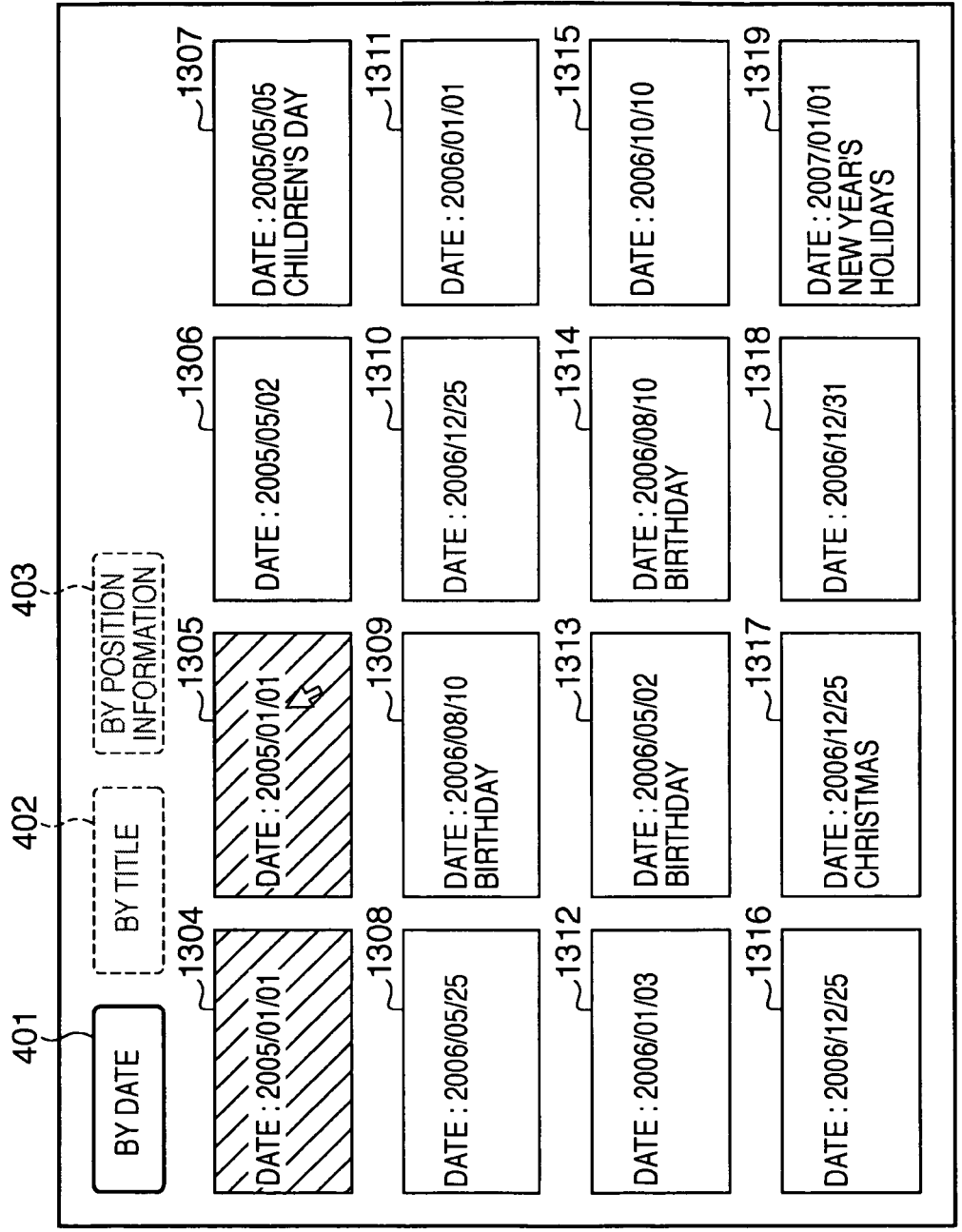
FIG. 13 shows an exemplary state in which a plurality of data are displayed in date order as designated by the user, and two pieces of data have been selected.

FIG. 13 shows an exemplary state in which a plurality of data are displayed in date order as designated by the user, and two pieces of data have been selected. In FIG. 13, reference numerals 1304 to 1319 denote the plurality of data displayed in date order designated as the display mode.

Similarly to the first embodiment, the display mode can be changed as a result of the user designating one of the buttons 401 to 403 using an input apparatus such as a pointing device (mouse). Also, the user is able to assign metadata to data by selecting arbitrary data from 1304 to 1319.

The example shown in FIG. 13 is a state in which the date order button 401 has been designated, and the data 1304 to 1319 have been sorted and displayed based on respective date information from the top left to the bottom right of the output apparatus. Further, the user has selected the two pieces of data 1304 and 1305, and is looking to assign metadata.

Figure 14:
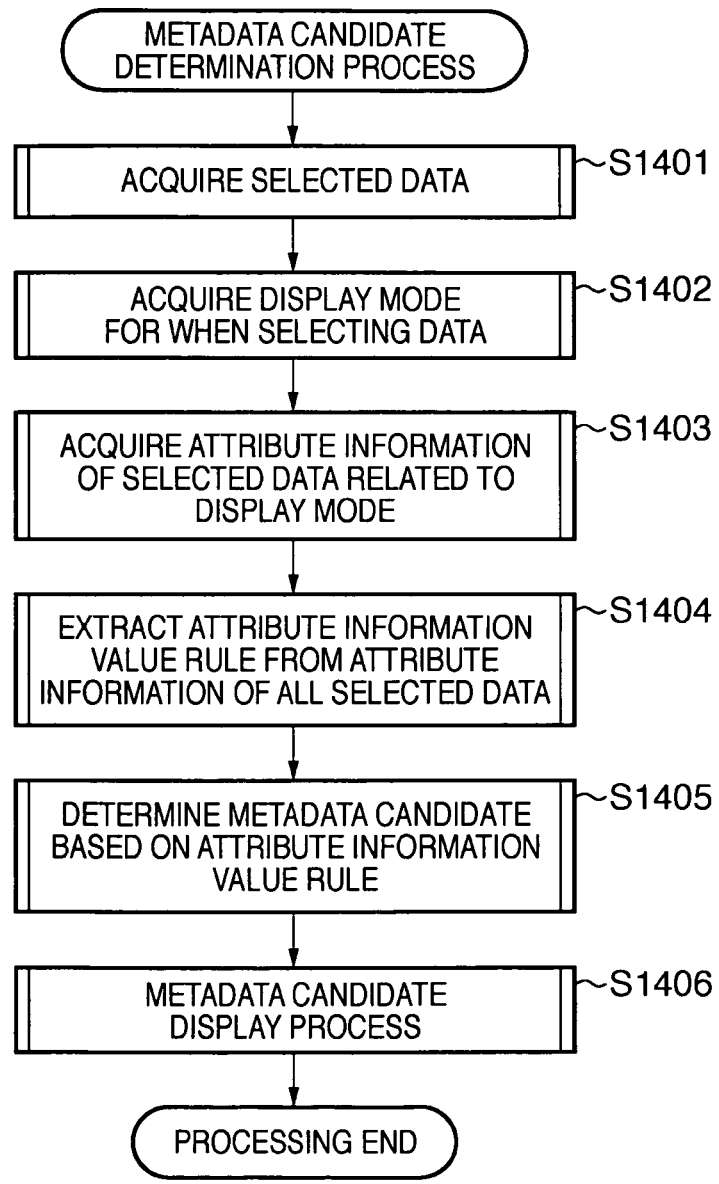
FIG. 14 is a flowchart showing an exemplary metadata candidate determination process in a third embodiment.

FIG. 14 is a flowchart showing an exemplary metadata candidate determination process in the third embodiment. In FIG. 14, S1401 to S1406 are reference numerals denoting the various steps. In the third embodiment, the processing of S503 in the metadata candidate determination process of the first and second embodiments shown in FIG. 5 has, by way of S1403 and S1404, been made compliant with the case where a plurality of data are selected.

Firstly, in S1401, the data selected in the above-mentioned data selection process (S307) is acquired. Here, the two pieces of data 1304 and 1305 shown in FIG. 13 have been selected. Next, in S1402, the display mode acquired in the above-mentioned display mode acquisition process (S303) is acquired. Here, the date order button 401 shown in FIG. 13 has been designated, and the display mode is "by date". Further, in S1403, attribute information values related to the display mode acquired in S1402 for when selecting data is acquired from the detailed information of the selected data acquired in S1401.

In the third embodiment, the two pieces of data 1304 and 1305 have been selected in the "by date" display mode, so the attribute information values "Date: 2005/01/01" and "Date: 2005/01/01" related to respective data information are acquired.

Next, in S1404, an attribute information value rule is extracted based on the attribute information values of all of the data. This attribute information value rule extraction process will be further described below in detail using FIG. 15. Next, in S1405, a candidate for metadata is determined based on the attribute information value rule determined in S1404. Finally, in S1406, the metadata candidate determined in S1404 is presented (displayed) to the user as metadata, and this process is ended.

Here, an attribute information value rule extraction process (S1404) of extracting the above-mentioned attribute information value rule will be described in detail using FIG. 15.

Figure 15:
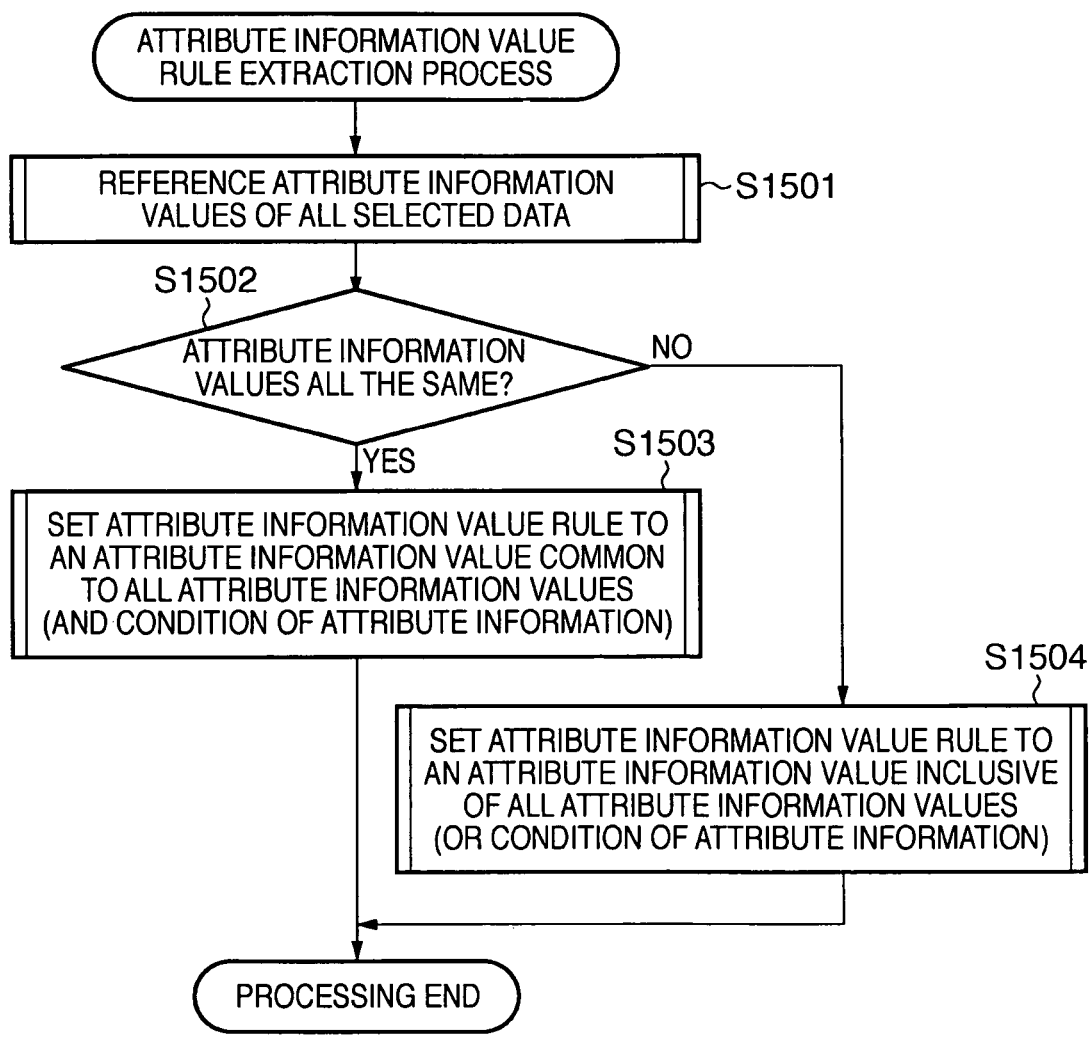
FIG. 15 is a flowchart showing in detail an attribute information value rule extraction process.

FIG. 15 is a flowchart showing in detail the attribute information value rule extraction process. In FIG. 15, S1501 to S1504 are reference numerals denoting the various steps.

Firstly, in S1501, the attribute information values of the two pieces of selected data acquired in S1403 are referenced. Then, in S1502, it is determined whether the attribute information values referenced in S1501 are all the same. If all the same, the processing proceeds to S1503, and the attribute information value rule is set to an attribute information value common to all of the attribute information values (AND condition of attribute information values).

If, in S1502, the attribute information values referenced in S1501 are not all the same, the processing proceeds to S1504, and the attribute information value rule is set to an attribute information value inclusive of all of the attribute information values (OR condition of attribute information values).

In the present example, the attribute information values "Date: 2005/01/01" and "Date: 2005/01/01" related to the date information of the two pieces of data 1304 and 1305 are acquired, so the attribute information value rule will be an AND condition of the attribute information values. Therefore, the determination of S1502 proceeds to YES, and in S1503 the attribute information value rule is set to "Date: 2005/01/01".

The processing of S1405 is similar to the processing of S504 shown in FIG. 5 of the first embodiment, and in S1406 "New Year's Day" determined as the metadata candidate is displayed to the user.

Figure 16:
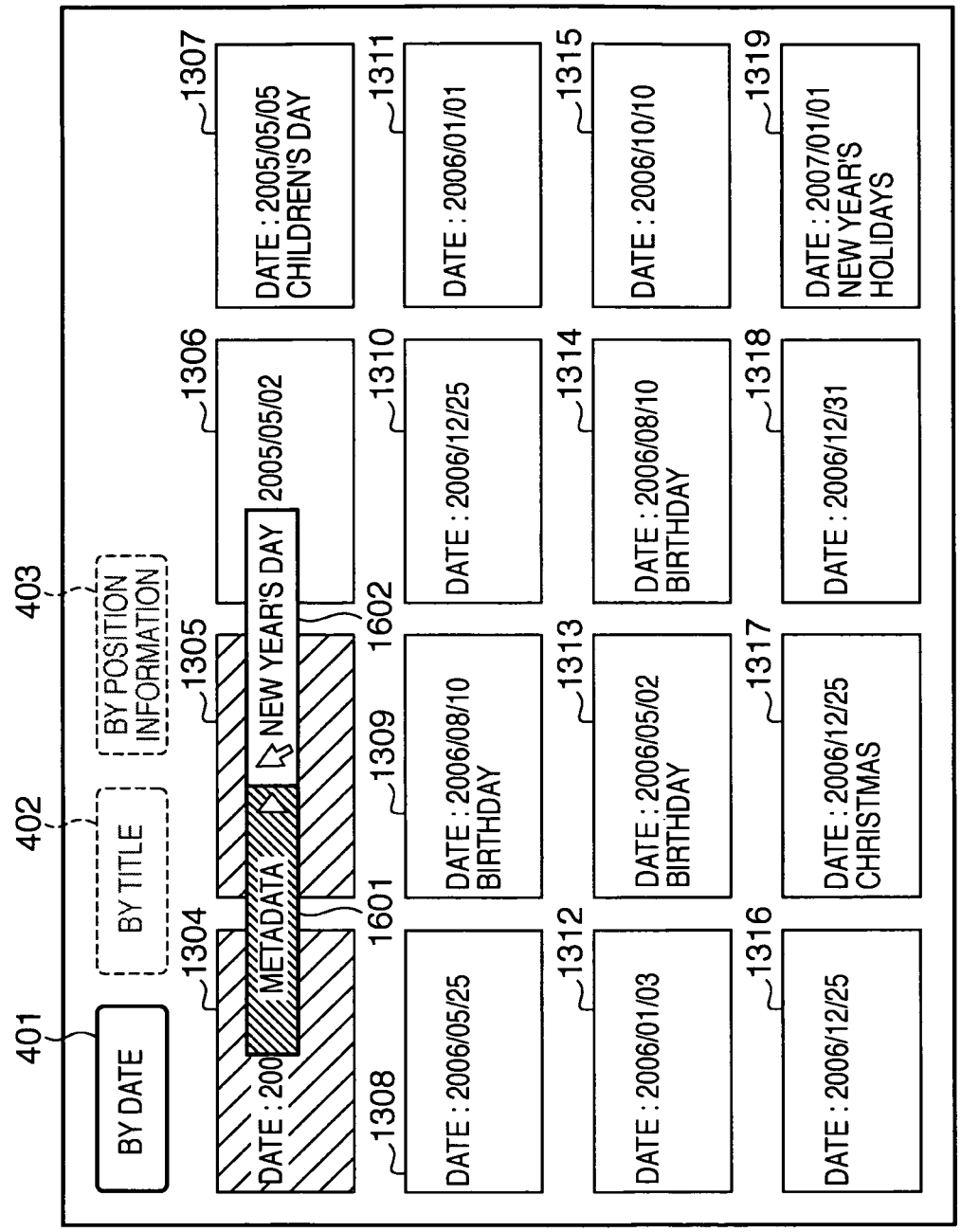
FIG. 16 shows a result of the metadata candidate determination process in the third embodiment.

FIG. 16 shows a result of the metadata candidate determination process in the third embodiment. In FIG. 16, "New Year's Day" 1602 is displayed to the user as metadata 1601 after "New Year's Day" has been determined as the metadata candidate 703 to be assigned to the data 1304 and 1305 as a result of the metadata candidate determination process when the data 1304 and 1305 are selected.

A metadata candidate with a good chance of being assigned can thus be determined and presented to the user while reflecting the intent of the user, based on a plurality of data, with consideration given to the fact that a plurality of data were selected.

Also, while "by date" was given as an example in the description, in the case where data is displayed in position information order, for example, a metadata candidate with the best chance of being assigned may also be determined and displayed from a range that includes respective position information in the case where a plurality of data are selected.

Next, a fourth embodiment according to the present invention will be described in detail with reference to the drawings. In the fourth embodiment, a metadata candidate to be assigned is determined and displayed based on OR information of respective date information in the case where the attribute information values, that is, the dates, of the two pieces of data differ in the third embodiment.

Figure 17:
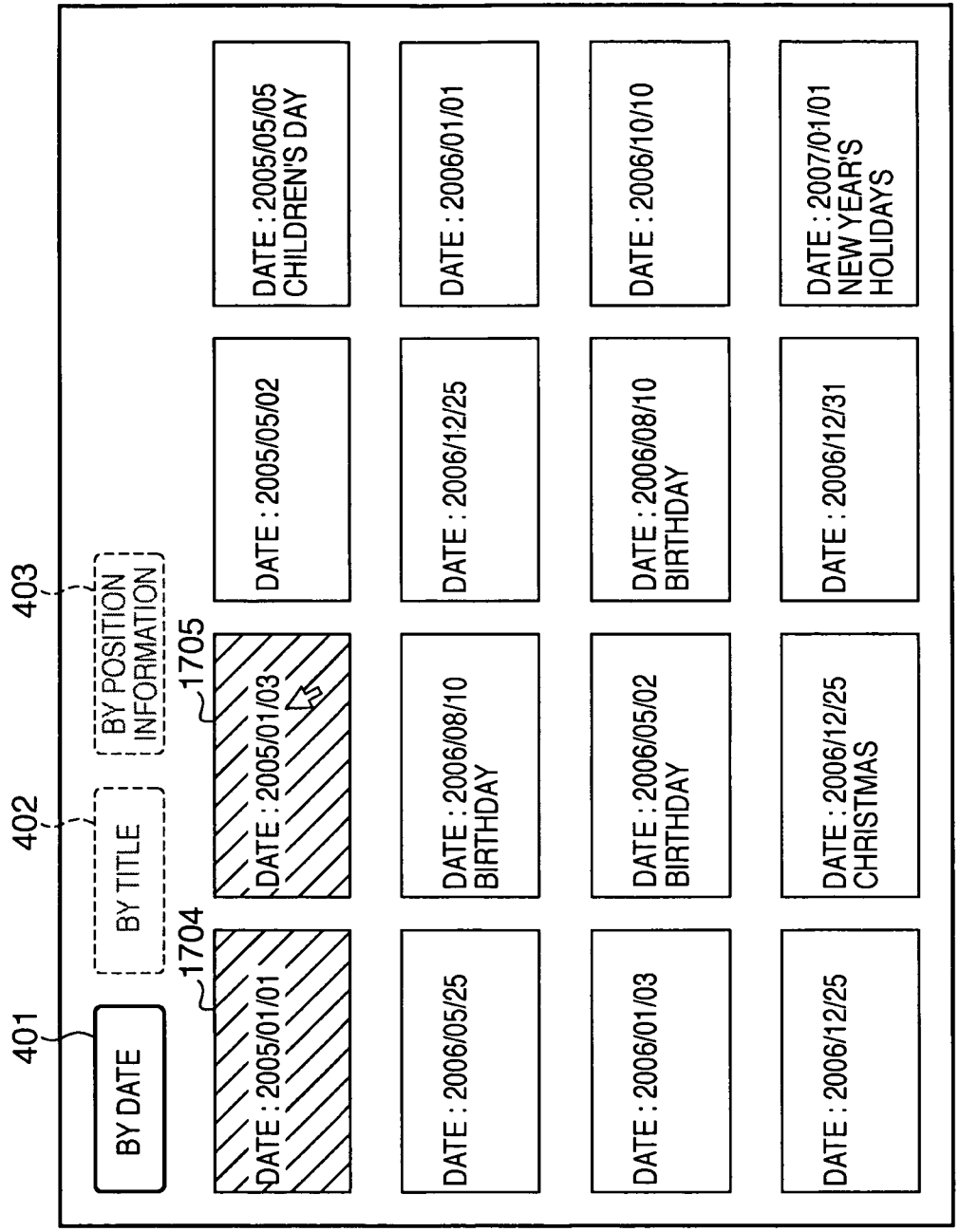
FIG. 17 shows an exemplary state in which a plurality of data are displayed in date order as designated by the user, and two pieces of data have been selected.

FIG. 17 shows an exemplary state in which a plurality of data are displayed in date order as designated by the user, and two pieces of data have been selected. Since the state shown in FIG. 17 is similar to the state shown in FIG. 13 described in the third embodiment, description thereof will be omitted.

Here, the metadata candidate determination process in the fourth embodiment is executed in accordance with the flowchart shown in FIG. 14, similarly to the third embodiment. Also, the attribute information value rule extraction process is executed in accordance with the flowchart shown in FIG. 15, similarly to the third embodiment.

A difference with the third embodiment lies in the fact that in S1401 the attribute information values related to the date information of the selected data 1704 and 1705 differ, being "Date: 2005/01/01" and "Date: 2005/01/03". Therefore, since the attribute information values of the two pieces of data differ, the determination of S1502 proceeds to NO, and in S1503 the attribute information value rule is set to the OR condition of the attribute information values, that is, "Date: 2005/01/01 ∪ Date: 2005/01/03".

Here, in the fourth embodiment, the calendar knowledge 901 shown in FIG. 9 is used. When processed similarly to the third embodiment, "New Year's Holidays" 903 of the metadata candidate B is retrieved as a candidate of the date 902 that satisfies the condition "Date: 2005/01/01" OR "Date: 2005/01/03". Therefore, the metadata candidate will be "New Year's Holidays" 903, and "New Year's Holidays" is determined as metadata to be assigned. Then, in S1406, "New Year's Holidays" determined as the metadata candidate is presented to the user.

Figure 18:
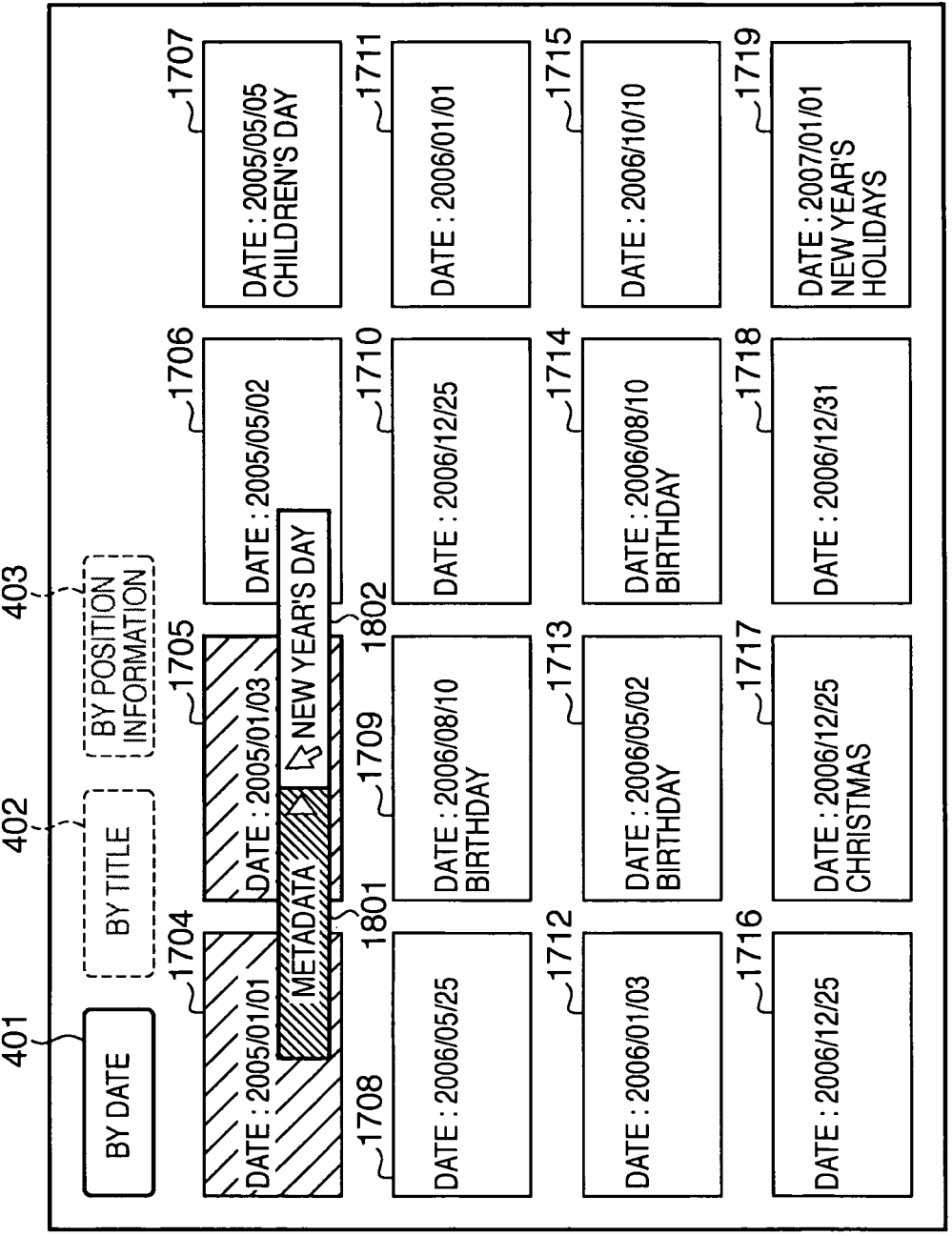
FIG. 18 shows a result of the metadata candidate determination process in a fourth embodiment.

FIG. 18 shows a result of the metadata candidate determination process in the fourth embodiment. In FIG. 18, "New Year's Holidays" 1802 is displayed to the user as metadata 1801 as a result of the metadata candidate determination process when data 1704 and 1705 are selected.

A metadata candidate with a good chance of being assigned can thus be determined and presented to the user while reflecting the intent of the user, based on a condition inclusive of all selected data, with consideration given to the fact that a plurality of data were selected.

Also, because a metadata candidate with an even better chance of being assigned can be presented to the user when a plurality of data are selected, the consistency of metadata is maintained together with reducing the user's workload in assigning metadata, thereby enabling metadata reusability to be improved.

Further, while a metadata candidate with a good chance of being assigned is determined based on an AND or an OR condition of the attribute information values of selected data when a plurality of data are selected, an arbitrary attribute information value rule may be created from the plurality of selected data.

Next, a fifth embodiment according to the present invention will be described in detail with reference to the drawings. In the fifth embodiment, a plurality of metadata candidates are displayed and the user is allowed to determine a metadata candidate, in the case where there are a plurality of metadata candidates related to attribute information, as shown in FIG. 10.

Figure 19:
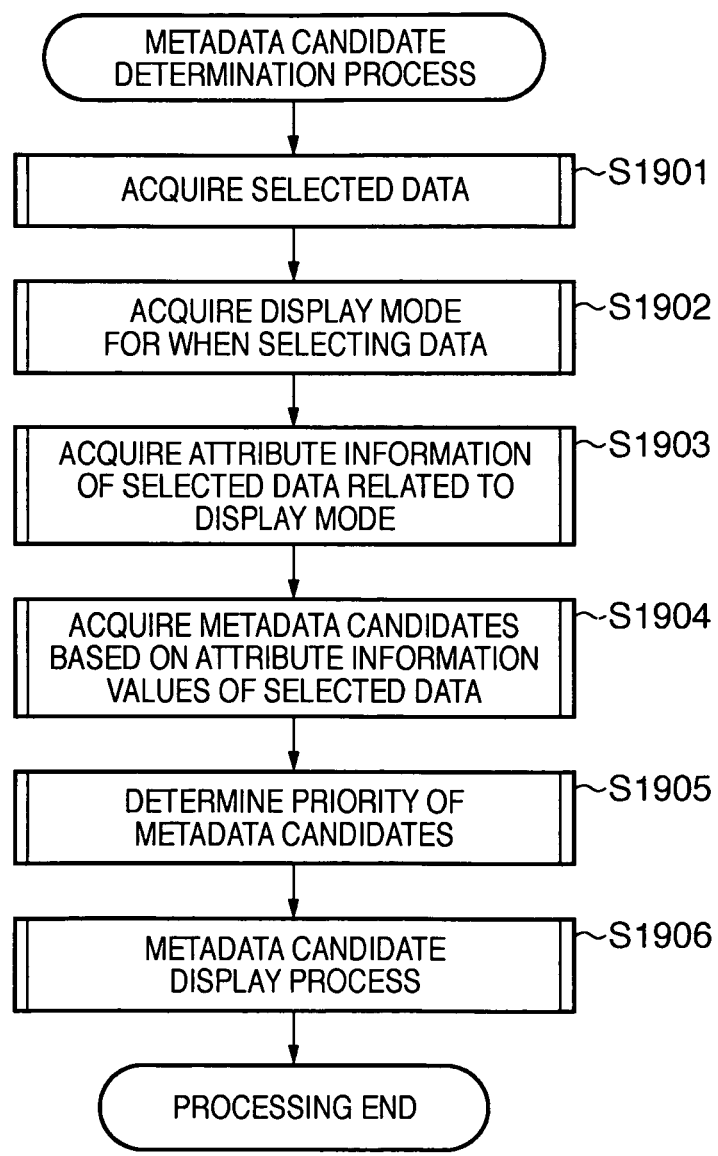
FIG. 19 is a flowchart showing an exemplary metadata candidate determination process in a fifth embodiment.

FIG. 19 is a flowchart showing an exemplary metadata candidate determination process in the fifth embodiment. In FIG. 19, S1901 to S1906 are reference numerals denoting the various steps. Also, the processing shown in FIG. 19 differs from the processing shown in FIG. 5 described in the first embodiment in that a process of determining the priority of metadata candidates (S1905) has been added.

In the fifth embodiment, the state is as shown in FIG. 13, that is, a state in which a plurality of data are displayed in date order as designated by the user, and two pieces of data have been selected, similarly to the third embodiment. Calendar knowledge 1001 shown in FIG. 10 is used when determining a metadata candidate in this state.

Here, in S1904, metadata candidates A, B and C for "Date" equals "January 1" 1002 are acquired as metadata candidates that satisfy the "Date: 2005/01/01" condition, similarly to the first embodiment. In the example shown in FIG. 10, the metadata candidate A "New Year's Day" 1003, the metadata candidate B "New Year's Holidays" 1004, and the metadata candidate C "New Year's Week" 1005 are respectively acquired.

Next, in S1905, the priority of the metadata candidates acquired in S1904 is determined. A process of determining this priority is performed in the case where a plurality of metadata candidates exist for the same display attribute value. In terms of the criterion for determining priority, priority may, for example, be set by metadata candidate knowledge, or in order of proximity to an attribute value condition. Alternatively, priority may be given for each apparatus or separately for each user.

In this example, the priority is metadata candidate A>metadata candidate B>metadata candidate C. In accordance with this criterion, the order will be "New Year's Day" 1003>"New Year's Holidays" 1004>"New Year's Week" 1005 when the priority of the acquired metadata candidates is determined in S1905, with "New Year's Day" 1003 having the highest priority. Then, in S1906, "New Year's Day", "New Year's Holidays", and "New Year's Week" are displayed to the user as metadata candidates.

Figure 20:
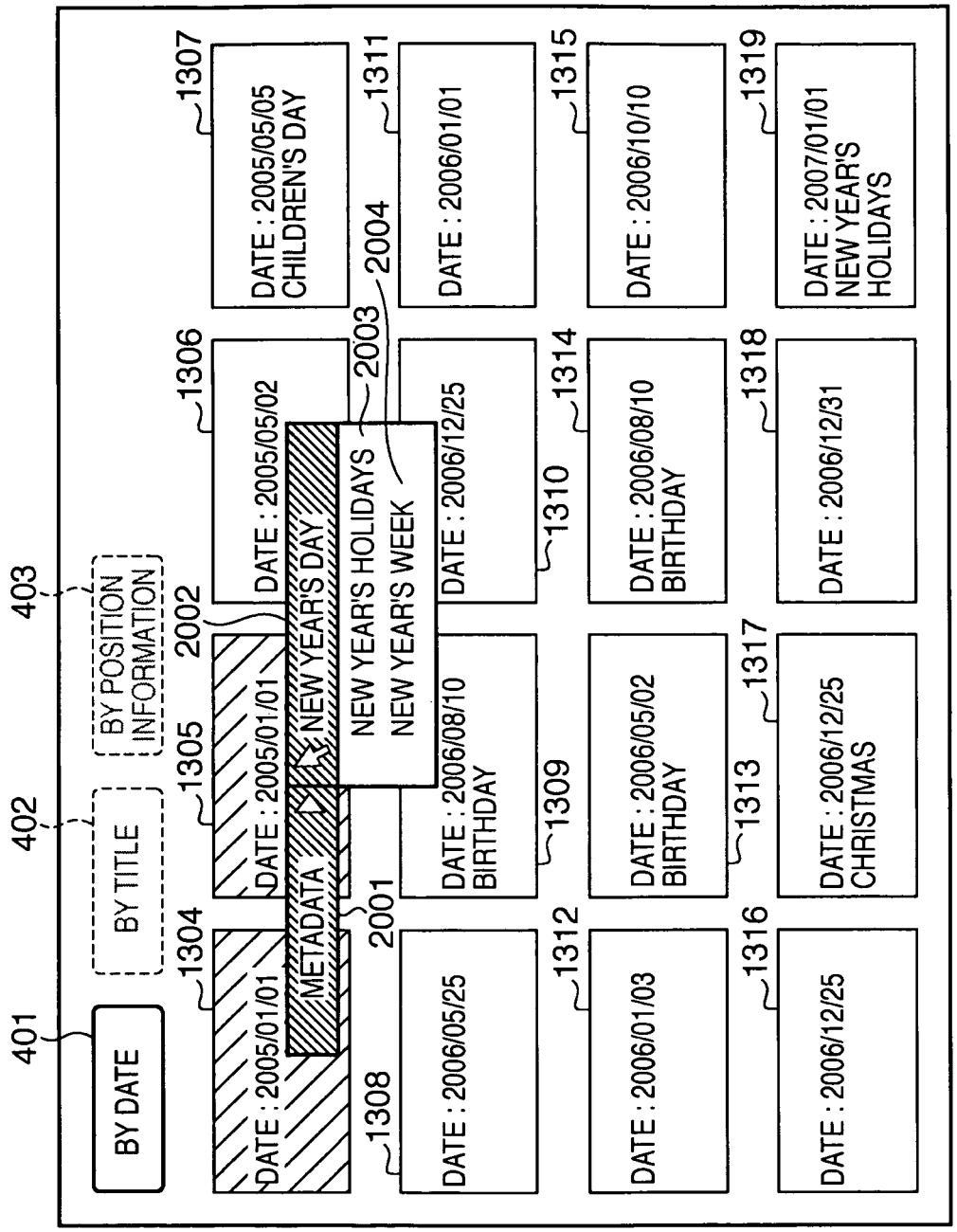
FIG. 20 shows a result of the metadata candidate determination process in the fifth embodiment.

FIG. 20 shows a result of the metadata candidate determination process in the fifth embodiment. In FIG. 20, "New Year's Day" 2002, "New Year's Holidays" 2003 and "New Year's Week" 2004 are displayed to the user in descending order as metadata 2001 to be assigned to the data 1304 and 1305 as a result of the metadata candidate determination process. Also, while two pieces of data have been selected in FIG. 20, the case where one piece of data is selected and a plurality of metadata candidates are to be assigned to the data can, needless to say, be similarly processed.

A plurality of metadata candidates can thus be presented to the user in the priority in the case of there being a plurality of metadata candidates to be assigned to data selected by the user.

Also, because a plurality of metadata candidates with a good chance of being assigned can be determined and presented to the user in the priority, the consistency of metadata is maintained together with reducing the user's workload in assigning metadata, thereby enabling metadata reusability to be improved.

Next, a sixth embodiment according to the present invention will be described in detail with reference to the drawings. In the sixth embodiment, metadata that has been assigned to data is added to a database as a metadata candidate.

Figure 21:
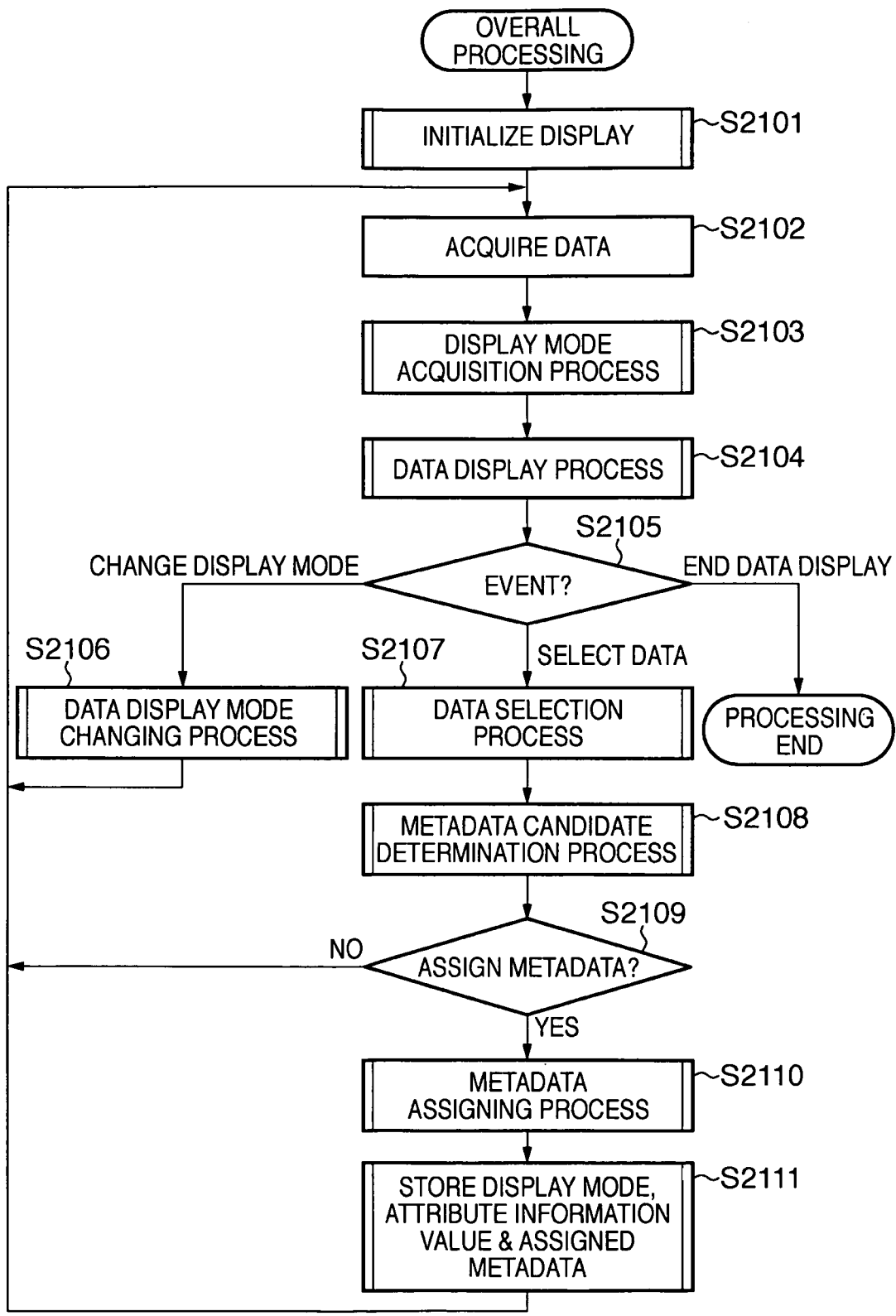
FIG. 21 is a flowchart showing the overall processing of the data management apparatus in a sixth embodiment.

FIG. 21 is a flowchart showing the overall processing of the data management apparatus in the sixth embodiment. The processing of S2101 to S2110 shown in FIG. 21 is the same as the processing of S301 to S310 shown in FIG. 3 described in the first embodiment. In the sixth embodiment, a process (S2111) of adding and storing a metadata candidate as a result of a user input in a metadata candidate mapping table that is referenced in order to perform the metadata candidate determination process has been added.

Figure 22:
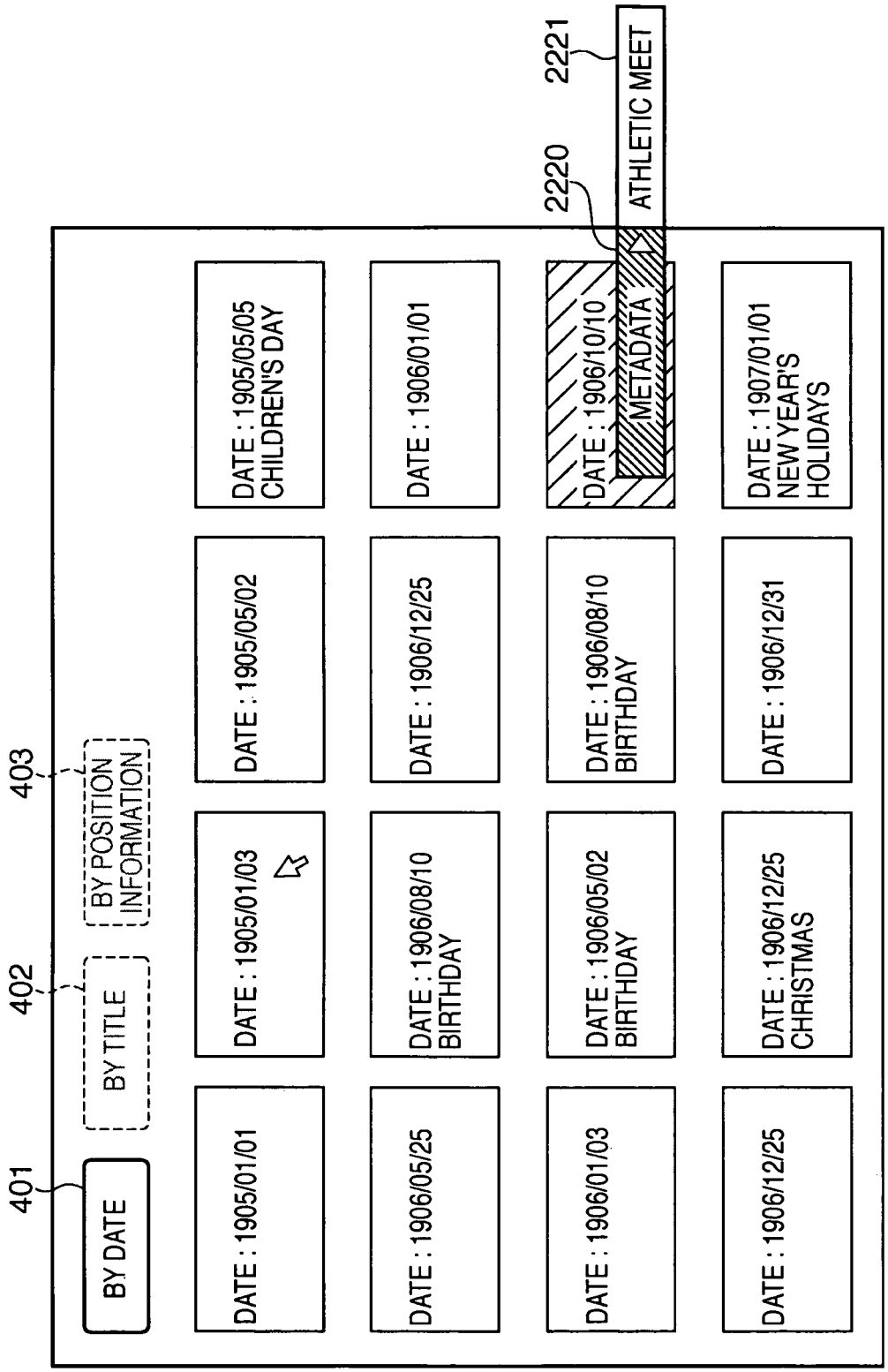
FIG. 22 shows an exemplary state in which the user has designated a metadata candidate when determining a metadata candidate based on an attribute information value of data selected by the user.

FIG. 22 shows an exemplary state in which the user has designated a metadata candidate when determining a metadata candidate based on an attribute information value of data selected by the user. The example shown is a state in which the user has designated "Athletic Meet" 2221 as metadata 2220 in the metadata candidate determination process, in the case where a metadata candidate corresponding to the date information of the selected data does not exist, as shown in FIG. 23.

In other words, in the sixth embodiment, a metadata candidate may be newly input by the user or acquired by another method and designated as new metadata, in the case where the metadata candidate determination process is performed using calendar knowledge (database) such as shown in FIG. 23.

The processing thus proceeds to S2111 shown in FIG. 21 when the metadata assigning process is newly instructed by the user inputting text, for instance, and the selected data is saved with the metadata to be newly assigned added thereto. Further, the display mode, the attribute information value of the data related to that display mode, and the newly assigned metadata is added to the metadata mapping table shown in FIG. 23 that is used in the case where the display mode is "by date", and stored.

FIG. 24 shows an exemplary metadata mapping table to which metadata designated by the user has been added. As shown in FIG. 24, "Athletic Meet" 2404 is added as a metadata candidate 2402 corresponding to the attribute information value "October 10" 2403 of date 2401.

A metadata candidate with a better chance of being assigned can thus be presented by storing metadata newly assigned by the user in the display mode at the time that the metadata was assigned.

Note that the display attribute corresponding to a display mode need not be time information such as a date or GPS map information showing latitude and longitude values, and it is possible to create a display mode based on the attribute information of data. In this case, a metadata candidate may be determined based on the display attribute of data corresponding to that display mode and the attribute information values for that display attribute.

While the metadata candidate determination processing in the embodiments includes a process of displaying and presenting a determined metadata candidate to the user, all processes except for display to the user may be performed and the processing ended at the stage at which a metadata candidate is determined.

Further, the metadata candidate determination process may be executed by right clicking with data in a selected state, and metadata candidates may be presented to the user as a context menu.

Also, metadata candidates may be presented to the user by being displayed in the form of a pull-down menu or a list box, or by simultaneously displaying metadata candidates determined by a method other than a metadata candidate determination process.

Further, when displaying and presenting metadata candidates to the user, candidates for metadata may be determined for each display attribute of the metadata, and displayed to the user by category, rather than presenting only metadata candidates determined according to the display mode.

A configuration in which the user assigns metadata to data by selecting a plurality of arbitrary metadata from displayed (presented) metadata candidates is also possible.

Note that the present invention may be applied to a system constituted by a plurality of devices (e.g., host computer, interface device, reader, printer) or an apparatus composed of a single device (e.g. copier, facsimile machine).

Also, the present invention can be implemented by supplying a recording medium having recorded thereon the program code of software for realizing the functions of the foregoing embodiments to a system or an apparatus, and reading out and executing the program code stored on the recording medium with a computer (or CPU or MPU) in the system or apparatus.

In this case, the actual program code read out from the computer-readable recording medium realizes the functions of the foregoing embodiments, and the recording medium storing this program code constitutes the present invention.

Recording media that can be used for supplying this program include, for example, flexible disk, hard disk, optical disk, magneto-optical disk, CD-ROM, CD-R, magnetic tape, nonvolatile memory card, and ROM.

The functions of the foregoing embodiments are realized in the following cases, rather than only as a result of a computer executing the read program. That is, the case where an operating system or the like running on a computer performs part or all of the actual processing based on instructions in the program code, and the functions of the foregoing embodiments are realized as a result of this processing.

Further, the case where the program code read out from the recording medium is written to a memory provided in a function expansion board inserted in a computer or a function expansion unit connected to a computer, a CPU or the like provided in the function expansion board or the function expansion unit subsequently performs part or all of the actual processing based on instructions in the program code, and the functions of the foregoing embodiments are realized as a result of this processing, is also, needless to say, included.

The present invention enables the use efficiency of metadata to be improved by maintaining the consistency of metadata, while at the same time reflecting the intent of the user, when assigning the metadata.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-317588 filed on Dec. 7, 2007, which is hereby incorporated by reference herein in its entirety.

What is claimed is:

1. A data management apparatus assigning metadata of a first kind and metadata of a second kind to a plurality of content data, the apparatus comprising:
   a display unit that displays the plurality of content data, according to a display mode selected from a plurality of display modes for displaying the plurality of content data, wherein the plurality of display modes includes a first display mode in which the plurality of content data is sorted and displayed based on an attribute information numeric value for specifying the metadata of the first kind and a second display mode in which the plurality of content data is sorted and displayed based on an attribute information numeric value for specifying the metadata of the second kind; and
   a processor configured to determine, when content data is selected from the plurality of content data displayed in the selected display mode, a candidate for metadata in accordance with an attribute information numeric value of the selected content data; and
   a metadata candidate display unit that displays the determined candidate for metadata,
   wherein metadata is assigned to the selected content data by an assignment unit,
   wherein the attribute information numeric value shows a month and a day in a case where the first display mode is a display mode for causing data to be displayed in date order,
   wherein the attribute information numeric value shows a latitude and a longitude in a case where the second display mode is a display mode for causing data to be displayed in position information order,
   wherein said processor determines, when the plurality of content data is displayed according to the first display mode and one of the plurality of content data being displayed according to the first display mode is selected as content data of interest, the candidate for metadata related to a date of the content data of interest as a display target, and determines, when the plurality of content data is displayed according to the second display mode and one of the plurality of content data being displayed according to the second display mode is selected as the content data of interest, the candidate for metadata related to position information of the content data of interest as a display target, and
   wherein said metadata candidate display unit displays, when one of the plurality of content data being displayed according to the first display mode is selected as the content data of interest, the candidate for metadata related to a date of the content data of interest, and displays, when one of the plurality of content data being displayed according to the second display mode is selected as the content data of interest, the candidate for metadata related to position information of the content data of interest.

2. A data processing method executed by a data management apparatus assigning metadata of a first kind and metadata of a second kind to a plurality of content data, the method comprising:
   a display unit that displaying the plurality of content data, according to a display mode selected from a plurality of display modes for displaying the plurality of content data, wherein the plurality of display modes includes a first display mode in which the plurality of content data is sorted and displayed based on an attribute information numeric value for specifying the metadata of the first kind and a second display mode in which the plurality of content data is sorted and displayed based on an attribute information numeric value for specifying the metadata of the second kind; and
   determining, when content data is selected from the plurality of content data displayed in the selected display mode, a candidate for metadata in accordance with an attribute information numeric value of the selected content data; and
   displaying the determined candidate for metadata,
   wherein metadata is assigned to the selected content data,
   wherein the attribute information numeric value shows a month and a day in a case where the first display mode is a display mode for causing data to be displayed in date order,
   wherein the attribute information numeric value shows a latitude and a longitude in a case where the second display mode is a display mode for causing data to be displayed in position information order,
   wherein the determining determines, when the plurality of content data is displayed according to the first display mode and one of the plurality of content data being displayed according to the first display mode is selected as content data of interest, the candidate for metadata related to a date of the content data of interest as a display target, and determines, when the plurality of content data is displayed according to the second display mode and one of the plurality of content data being displayed according to the second display mode is selected as the content data of interest, the candidate for metadata related to position information of the content data of interest as a display target, and
   wherein said metadata candidate display unit displays, when one of the plurality of content data being displayed according to the first display mode is selected as the content data of interest, the candidate for metadata related to a date of the content data of interest, and displays, when one of the plurality of content data being displayed according to the second display mode is selected as the content data of interest, the candidate for metadata related to position information of the content data of interest.

3. A non-transitory computer-readable medium containing computer-executable instructions to be utilized in a data management apparatus assigning metadata of a first kind and metadata of a second kind to a plurality of content data, the medium comprising:
   computer-executable instructions for displaying the plurality of content data, according to a display mode selected from a plurality of display modes for displaying the plurality of content data, wherein the plurality of display modes includes a first display mode in which the plurality of content data is sorted and displayed based on an attribute information numeric value for specifying the metadata of the first kind and a second display mode in which the plurality of content data is sorted and displayed based on an attribute information numeric value for specifying the metadata of the second kind; and
   computer-executable instructions for determining, when content data is selected from the plurality of content data displayed in the selected display mode, a candidate for metadata in accordance with an attribute information numeric value of the selected content data; and
   computer-executable instructions for displaying the determined candidate for metadata, wherein metadata is assigned to the selected content data by computer-executable instructions, wherein the attribute information numeric value shows a month and a day in a case where the first display mode is a display mode for causing data to be displayed in date order, wherein the attribute information numeric value shows a latitude and a longitude in a case where the second display mode is a display mode for causing data to be displayed in position information order, wherein the determining determines, when the plurality of content data is displayed according to the first display mode and one of the plurality of content data being displayed according to the first display mode is selected as content data of interest, the candidate for metadata related to a date of the content data of interest as a display target, and determines, when the plurality of content data is displayed according to the second display mode and one of the plurality of content data being displayed according to the second display mode is selected as the content data of interest, the candidate for metadata related to position information of the content data of interest as a display target, and wherein said metadata candidate display unit displays, when one of the plurality of content data being displayed according to the first display mode is selected as the content data of interest, the candidate for metadata related to a date of the content data of interest, and displays, when one of the plurality of content data being displayed according to the second display mode is selected as the content data of interest, the candidate for metadata related to position information of the content data of interest.

* * * * *